(12) United States Patent
Bietenhader

(10) Patent No.: US 7,407,134 B2
(45) Date of Patent: *Aug. 5, 2008

(54) AUXILIARY NOSE UNDERCARRIAGE, A FORCE-TRANSMISSION STRUCTURE, AND A ROTARY WING AIRCRAFT

(75) Inventor: Claude Bietenhader, Lambesc (FR)

(73) Assignee: Eurocopter, Marignana Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/408,171

(22) Filed: Apr. 21, 2006

(65) Prior Publication Data
US 2007/0095976 A1 May 3, 2007

(30) Foreign Application Priority Data
Apr. 22, 2005 (FR) .................................. 05 04030

(51) Int. Cl.
B64C 25/10 (2006.01)
B64C 25/14 (2006.01)
B64C 25/20 (2006.01)
B64C 1/00 (2006.01)
B64C 30/00 (2006.01)

(52) U.S. Cl. ............................... 244/102 A; 244/17.11; 244/17.17; 244/102 R; 244/117 R; 244/119

(58) Field of Classification Search .............. 244/102 R, 244/102 A, 102 SL, 102 SS, 100 R–103 W, 244/117 R, 118.1, 119, 120, 118.2, 17.11, 244/108, 17.17
See application file for complete search history.

(56) References Cited

U.S. PATENT DOCUMENTS 2,280,185 A * 4/1942 Bridges ................ 244/102 SL
2,312,553 A    3/1943 Hudson
2,630,990 A * 3/1953 Lindquist et al. ........ 244/102 SL
2,779,556 A * 1/1957 Hogan ......................... 244/50
2,856,180 A * 10/1958 Wescott, Jr. .............. 267/64.15
2,943,818 A * 7/1960 Camino et al. ................ 244/50
2,974,909 A * 3/1961 Perdue ................... 244/102 R
3,826,450 A * 7/1974 Currey et al. ........... 244/103 R
3,904,153 A * 9/1975 Watts .......................... 244/50
3,954,232 A * 5/1976 Harper ................... 244/102 R
4,433,820 A * 2/1984 Turiot .................... 244/102 R
4,445,672 A * 5/1984 Turiot .................... 267/64.16
4,537,374 A * 8/1985 Barnoin et al. .......... 244/102 R
4,630,788 A * 12/1986 Veaux et al. ........... 244/104 FP
4,634,082 A * 1/1987 Kendall ................... 244/100 R (Continued)

FOREIGN PATENT DOCUMENTS

FR          935170       6/1948

(Continued)

*Primary Examiner*—Michael R. Mansen
*Assistant Examiner*—Joshua J Michener
(74) *Attorney, Agent, or Firm*—Young & Thompson

(57) ABSTRACT

A steerable auxiliary nose undercarriage (2) for a rotary wing aircraft (1); the undercarriage (2) being retractable substantially rearwards. In the undercarriage (2), an oscillating system (13) presents a elevation stroke (58) about its hinged front end (52) that is greater than a shock absorbing stroke (59), and a shock-absorbing actuator (9) possesses retraction elements for going beyond a high abutment position of the oscillating system (13) so that the oscillating system (13) and the shock-absorbing actuator (9) provide both a shock-absorption function and an undercarriage retraction function.

9 Claims, 4 Drawing Sheets

U.S. PATENT DOCUMENTS

| | | | | |
|---|---|---|---|---|
| 4,770,372 | A * | 9/1988 | Ralph | 244/102 R |
| 4,821,983 | A * | 4/1989 | Aubry et al. | 244/104 FP |
| 5,029,775 | A * | 7/1991 | Abramovitsh | 244/102 R |
| 5,242,131 | A * | 9/1993 | Watts | 244/103 W |
| 5,310,139 | A * | 5/1994 | Derrien et al. | 244/104 FP |
| 5,330,132 | A * | 7/1994 | Lucienne et al. | 244/104 FP |
| 5,337,976 | A * | 8/1994 | Derrien | 244/102 A |
| 5,482,228 | A * | 1/1996 | Hoshino | 244/50 |
| 5,562,264 | A | 10/1996 | Bietenhader et al. | |
| 5,944,283 | A * | 8/1999 | Carter, Jr. | 244/104 FP |
| 6,666,407 | B2 * | 12/2003 | Pancotti | 244/102 R |
| 6,796,124 | B2 * | 9/2004 | Kutlucinar | 60/528 |
| 6,824,100 | B1 * | 11/2004 | Cheetham | 244/102 R |

FOREIGN PATENT DOCUMENTS

| | | |
|---|---|---|
| FR | 1390909 | 3/1965 |
| FR | 2677951 | 12/1992 |
| FR | 2687123 A1 * | 8/1993 |
| FR | 2769584 | 4/1999 |
| GB | 527994 | 10/1940 |
| WO | WO 00/05130 | 2/2000 |

* cited by examiner

AUXILIARY NOSE UNDERCARRIAGE, A FORCE-TRANSMISSION STRUCTURE, AND A ROTARY WING AIRCRAFT

The invention relates to a nose undercarriage for a rotary wing aircraft such as a rotorcraft. The invention also relates to a force-transmission structure provided with such an undercarriage, and it also relates to an aircraft.

BACKGROUND OF THE INVENTION

In numerous such aircraft, in particular for the purpose of ensuring that the aircraft can be used for multiple purposes in spite of the constraints set out below, the following are guaranteed:
ground clearance should be reduced as much as possible;
safety should be acceptable in the event of an emergency or crash landing;
aerodynamic resistance should be low; and
the aircraft should have excellent stability on the ground.

These constraints lead in particular to providing landing gear mounted on the aircraft so as to be retractable, with the landing gear also operating in a specific manner in the event of an emergency, and in particular of a crash.

Furthermore, in certain aircraft, it is necessary for the landing gear to be compatible with naval requirements, i.e. for landing on a ship. In such circumstances, the landing gear must be steerable through 180° in either direction (±180°), it must be capable of being locked relative to its steering axis, and it must avoid a parasitic wobbling phenomenon known as "shimmy".

In the field of rotary wing aircraft, the term "shimmy" designates rapid oscillation of a wheel about a pivot axis leading to strong interfering forces that can even lead to the undercarriage being destroyed.

In addition, the arrangement of a nose undercarriage must not impede the operation and the installation on the aircraft of detection equipment such as radars.

The fuselage of such an aircraft, or at least some of its structural elements, must also be compatible with the above-mentioned constraints.

Firstly, this is often incompatible with the occupants of the aircraft having good visibility between the passenger compartment and the cockpit.

Secondly, it is useful for the inside of the cabin to present an arrangement that allows its occupants to move without difficulty between the passenger compartment and the cockpit.

It is also desirable for the cabin to present an arrangement on its inside that leaves space available either for elements forming part of the aircraft, or for objects that are needed by the crew or the passengers.

However, in the past, the structures of fuselages and undercarriages have not enabled the desired results to be achieved.

At least, at present, complying with certain specifications is contradictory to achieving other functions, thus making it necessary to find compromises that are not always acceptable in practice.

With reference to undercarriages, mention is made below of a few documents of interest.

French patent No. 2 608 242 describes a shock absorber for the landing gear of a rotary wing aircraft.

That shock absorber is for main landing gear including a rocker arm. It is then disposed in a position that is substantially vertical, and as a result its shock-absorbing function, i.e. resilient and damped absorption of the energy of the downward movement of the aircraft while landing and touching the ground, is performed in compression under load.

French patent No. 2 635 498 describes a device for steering the wheels of an aircraft nose undercarriage. A rod slides along its axis in a tube with its free end carrying the wheels.

A scissors connects the tube and the rod in pivoting. A retraction actuator includes means for limiting forces in the event of a crash. A shock absorber presents a longitudinal axis that coincides with the wheel axis.

French patent No. 2 647 170 describes a device for reducing the flexibility of a shock absorber for a helicopter undercarriage. A shock absorber cylinder includes a shock absorber piston and a shock absorber rod mounted to slide in leaktight manner relative to the cylinder and defining within the shock absorber a compression chamber containing a hydraulic fluid that is substantially incompressible.

An expansion chamber contains a hydraulic fluid adjacent to a compressible fluid under pressure, and communicates with the compression chamber via means for throttling the fluid expelled from the compression chamber.

French patent No. 2 677 951 describes an electrical steering device for an aircraft undercarriage. An electric motor is secured to a shock absorber box and is associated with a drive shaft which is disposed parallel to the axis of the box. A steering rod is secured to the drive shaft and to a pivoting tube.

French patent No. 2 689 088 describes a shock-absorbing actuator for a helicopter. It includes a function of limiting forces in the event of a crash. It comprises a strut and performs the functions of maneuver, absorbing shocks, or peak-limiting forces.

French patent No. 2 684 957 describes a peak-limiting device for a shock absorber for a helicopter landing gear. That shock absorber is hinged via ball joints. The landing gear is neither steerable nor retractable, and the peak-limiting device is always integrated in the shock absorber.

British patent No. 527 994 describes a device for steering an aircraft undercarriage. The steering axis of the wheel intersects its axis of revolution.

A hinge allows a rocker arm to rock relative to the structure of the aircraft. That device comprises two arms extending in elevation on either side of a sleeve for receiving the steering axis of the wheel, in order to position the height of said steering axis, i.e. position it in elevation.

U.S. Pat. No. 2,493,649 describes a drive system for steerable front wheels of an aircraft with a shock absorber that presents a longitudinal axis intersecting the axis of the wheel.

U.S. Pat. No. 5,944,283 describes a shock absorber for an anti-crash undercarriage. Its rocker arm axis is offset.

U.S. Pat. No. 6,257,521 describes an aircraft tail wheel, in which the axis of its rocker arm is offset in order to avoid interfering movements.

With reference to the structure of a rotary wing aircraft, mention is made below of a few documents of interest in this technical field.

European patent No. 1 052 169 describes, in a helicopter, a truss of beams rigidly secured to the floor and to the skin at the bottom of the fuselage.

European patent No. 1 426 289 describes a helicopter structure that withstands impacts, and an energy absorber.

That structure forms a frame constituted by tubes of fiber-reinforced composite material, instead of I-section beams. The tubes are filled with foam material. The tubes are placed under the side wall at points where loads are induced in the event of a crash.

That document does not provide for a box having solid walls to be interposed at a distance from the side walls of the fuselage, above the auxiliary nose landing gear which itself disposed close to the center of the aircraft in its transverse direction.

French patent No. 2 629 045 describes a structural assembly for a light airplane. A passenger compartment is constituted by a central or main partition at the back of the compartment, by a front partition at the front end of the compartment, and by a hollow central beam extending in the longitudinal direction of the airplane.

That assembly is reinforced by the fuselage walls. On the rear partition, there are secured the rear portion of the fuselage and a main landing gear.

The front portion of the central beam is then used to receive a portion of the landing gear in the retracted position.

French patent No. 2 693 976 describes a helicopter fuselage having a central structure and, connected thereto: a front structure; a rear structure; and a landing gear.

Those structures support a transmission unit, a main rotor, and an engine.

The central structure has a framework provided with covering elements that define the outside shape of the fuselage. The framework is substantially in the form of a hexahedron with framework panels being assembled to one another.

British patent No. 724 999 describes a frame for an aircraft such as a helicopter. The frame forms a truss of tubes leaving large side openings. In order to form the fuselage, a skin covers the truss of tubes and a floor is placed on the bottom portion of the truss.

U.S. Pat. No. 4,593,870 describes a fuselage structure for an aircraft, in particular a helicopter. Under the floor of the passenger cabin, behind the cockpit, that structure has a truss of beams made of composite material. The truss makes it possible to obtain increased and progressive resistance in the event of a crash landing.

Transverse walls with central openings separate the cockpit at the front from the passenger cabin behind it.

U.S. Pat. No. 5,451,015 describes an aircraft fuel tank, specifically for a helicopter. The tank is reinforced so as to withstand an emergency landing, and it is located behind a solid transverse partition.

That partition, which is placed behind seats, is provided with ribs so as to contribute to withstanding loads during normal operation of the aircraft.

International patent WO 00/05130 describes a helicopter fuselage. That fuselage has a central portion with a front portion and a rear portion connected thereto.

The central portion is provided with means for transmitting forces due to the main transmission unit, to the main rotor, to the landing gear, and to the tail boom.

That document does not describe a fuselage structure having a cavity for housing landing equipment, nor does it describe a fuselage suitable for providing passengers and crew members with free passage in a longitudinal direction on either side of the fuselage.

The teaching of those documents in particular does not make it possible to obtain a nose landing gear and/or a structure for the fuselage of a rotary wing aircraft for ensuring the following features simultaneously:
  low ground clearance;
  good safety in the event of a crash;
  minimum aerodynamic resistance and instability;
  landing gear that is unaffected by the instability phenomenon known as "shimmy";
  landing gear that is compatible with naval requirements;
  a structure of an arrangement that does not interfere with radars or other detectors;
  the occupants have good visibility towards the front;
  it is easy for occupants to move about in the aircraft; and
  inside spaces are made available.

OBJECTS AND SUMMARY OF THE INVENTION

To this end, the invention provides a steerable auxiliary nose undercarriage for a rotary wing aircraft, the undercarriage being retractable substantially rearwards and comprising at least:
  a wheel set having a wheel axle about which at least one wheel rotates;
  a generally longitudinally-extending oscillating system having both a free end with the wheel axle mounted close behind the free end, and a hinged front end that is longitudinally opposite from the free end, the oscillating system being pivotally mounted via at least one transverse hinge for anchoring to a force-transmission structure for being rigidly secured to the aircraft;
  the wheel axle being arranged on the oscillating system via a steering pivot, having a steering axis that substantially intersects the wheel axle;
  the steering pivot enabling the wheel to be steered on either side of a position corresponding to the aircraft running in a straight line;
  a steering actuator connected to a portion of the steering pivot that is constrained to pivot with the wheel axle, so as to steer the wheel on either side of the position for running in a straight line; and
  a shock-absorbing actuator having a connection end hinged to the oscillating system between the hinged front end and the free end, the shock-absorbing actuator having a coupling end axially opposite from its connection end, the coupling end being hinged to the structure.

According to the invention, in this undercarriage, the oscillating system presents an elevation stroke about its hinged front end that is greater than a shock-absorbing stroke, and the shock-absorbing actuator absorber possesses means for retracting the oscillating system beyond an abutment position marking the end of the shock-absorbing stroke, so that the system and the shock-absorbing actuator perform both the function of absorbing shocks and the function of retracting the undercarriage.

In an embodiment, the steering actuator is substantially integrated about the steering axis, e.g. the steering actuator comprises an electric motor having a highly geared-down drive outlet, e.g. using gearing, with a steerably-driven bushing that is driven in steering and connected to the portion of the steering pivot that is secured to the wheel axle, and a bushing that is stationary in steering that is secured to the oscillating system.

In an embodiment, the oscillating system is a trailed single-arm rocker that rocks in elevation; the axle of the wheel set being mounted substantially stationary both longitudinally and in elevation relative to the longitudinal free end.

In an embodiment, the connection end and the coupling end of the shock-absorbing actuator are hinged via ball joints respectively to the oscillating system and to the structure in such a manner that the shock-absorbing actuator is stressed mainly along its sliding axis.

In an embodiment, the shock-absorbing actuator extends substantially along an elevation direction, with its coupling end then being at the top, for being hinged to a portion of the structure which likewise extends substantially in the elevation direction.

In an embodiment, the shock-absorbing actuator extends substantially in an elevation direction, possibly with a small amount of slope upwards and rearwards, i.e. the connection end of the shock-absorbing actuator is close to the free end of the oscillating system.

In an embodiment, the shock-absorbing actuator extends substantially in the longitudinal direction, with its coupling end being for hinged connection to a reinforced structural bottom floor of the structure, while its connection end is associated with a crank fitting or the like of the oscillating system.

In an embodiment, the substantially longitudinal shock-absorbing actuator is designed essentially to be housed in a well of the structure for receiving the undercarriage when retracted, the connection end of the shock-absorbing actuator being close to the hinged front end of the oscillating system for example.

In an embodiment, the shock-absorbing actuator extends substantially in the longitudinal direction with its coupling end in front of the connection end, said shock-absorbing actuator being designed to have its connection end in a well of the structure while its coupling end projects longitudinally forwards from the well.

In an embodiment, the shock-absorbing actuator extends substantially in the longitudinal direction and acquires a small amount of slope on being retracted and while shock absorbing, or vice versa, either:
  upwards and rearwards; or else
  downwards and rearwards.

In an embodiment, the oscillating system is a deformable parallelogram, so that the steering pivot has its steering axis maintained substantially extending in the elevation direction between high and low positions of the oscillating system during shock absorbing and during retraction, the oscillating system comprising a pair of trailed arms disposed one above the other in elevation for example.

In an embodiment, the wheel set possesses at least one wheel having a flange and its tread coming in elevation substantially up to the level of the free end of the oscillating system; for example said wheel set possesses two wheels disposed in parallel on either side of the free end of the oscillating system.

In an embodiment, the landing gear presents:
  means that operate specifically in the event of a crash, and suitable, in the event of a crash, for inhibiting the retraction function and optionally the shock-absorption function of the shock-absorbing actuator; and
  force-limiter means for limiting forces in the event of a crash, arranged so that once the retraction function and optionally the shock-absorption function has/have been inhibited, the crash energy causes the oscillating system to rise through the additional amplitude and possibly also through the shock-absorbing stroke, with forces being absorbed by the force-limiter means.

In an embodiment, the force-limiter means are integrated at least in part in the shock-absorbing actuator, for example being completely integrated therein.

In an embodiment, the force-limiter means are integrated at least in part in the oscillating system, e.g. force-limiter means are integrated in the steering pivot, thereby providing the oscillating system with an energy-absorbing additional stroke in the event of a crash.

In an embodiment, the means for operating specifically in the event of a crash are arranged to inhibit only the retraction of the oscillating system, so that energy absorption is then available over the additional amplitude stroke, and possibly over an additional stroke provided by force-limiter means located outside the shock-absorbing actuator.

In an embodiment, the means for operating specifically in the event of a crash are arranged to inhibit both retraction and shock absorption by the shock-absorbing actuator so that energy absorption is then available over the maximum stroke.

The invention also provides a force-transmission structure for a rotary wing aircraft such as a helicopter, with at least one undercarriage as mentioned above mounted on said structure, which structure comprises at least:
  a rigid arrangement extending substantially in an elevation direction;
  a structural bottom floor rigidly connected to the arrangement and defining at least part of a well for retracting the undercarriage; and
  a machine top floor rigidly secured to the arrangement close to the top ends of lateral arms of said arrangement.

According to the invention, in longitudinal elevation view the structure presents an L-shape in which the arrangement forms a transversely centered box, and the oscillating system of the undercarriage is disposed substantially in register with the box that contributes within the structure to taking up forces coming from the undercarriage.

In an embodiment:
  the box and at least two lateral arms of the arrangement extend substantially in the elevation direction, while the structural bottom floor extends from the box and the arms substantially longitudinally in a forward direction;
  the box presents a profile that is at least partially open in section in a longitudinal and transverse plane, with at least one rearwardly-open opening to provide at least one housing; and
  the lateral arms of the rigid arrangement are arranged transversely at a distance from the box so as to leave transversely on either side thereof a passage for movement and visibility.

In an embodiment, this structure comprises at least:
within the structural bottom floor at least:
  an anchor point for receiving a hinge of the oscillating system of the undercarriage;
  two longitudinal spars extending longitudinally forwards from a bottom base of the arrangement; and
  two transverse spars disposed substantially transversely at right angles relative to the box, one of these spars being longitudinally in front of the box and the other spar being substantially in register with a rear face of the box;
and within the arrangement, two lateral arms extending substantially in elevation upwards from the rear of the structural bottom floor on either side of the arrangement.

In an embodiment, the retraction well is arranged longitudinally from the front transverse spar of the structural bottom floor coming substantially into register with a rear face of the box and/or possesses substantially the same transverse dimensions as the box.

In an embodiment, the transverse hinge for anchoring the shock-absorbing actuator is disposed substantially in register with the box, e.g. on the box, or beneath it on the structural bottom floor.

In an embodiment, the connection end of the shock-absorbing actuator connecting it to the oscillating system is disposed substantially in register with the box, e.g. longitudinally a little in front of a front face thereof.

In an embodiment, the box and/or the structural bottom floor and machine top floor are made at least in part out of composite material, e.g. out of elements formed by carbon/carbon sandwiches connected together by rivets and/or by adhesive.

The invention also provides a rotary wing aircraft such as a helicopter including an undercarriage mounted on the fuselage via a force-transmission structure.

According to the invention, the undercarriage and the structure are arranged in such a manner that the landing forces are distributed within the central box between the structural bottom floor and the machine top floor.

In an embodiment, the structure is covered by a fairing of the fuselage.

For example, such a fuselage fairing comprises at least:
a working covering forming an integral portion of the fuselage; and/or
a transparent surface improving visibility to the outside of the aircraft; and/or
a hatch for the landing gear or the like.

In helicopters, transparent surfaces in the fairing of the fuselage are very useful for visibility towards the ground, in particular while landing.

In an embodiment, the equipment such as radars or detection equipment is mounted on the structure in such a manner as to ensure installation and operation thereof on the aircraft is not impeded.

For example, a radar can be mounted to be retractable into a space provided in the force-transmission structure, such as a space in the structural bottom floor.

BRIEF DESCRIPTION OF THE DRAWINGS

The invention is described below with reference to embodiments given by way of non-limiting example and illustrated in the accompanying drawings, in which.

MORE DETAILED DESCRIPTION

Figure 1:
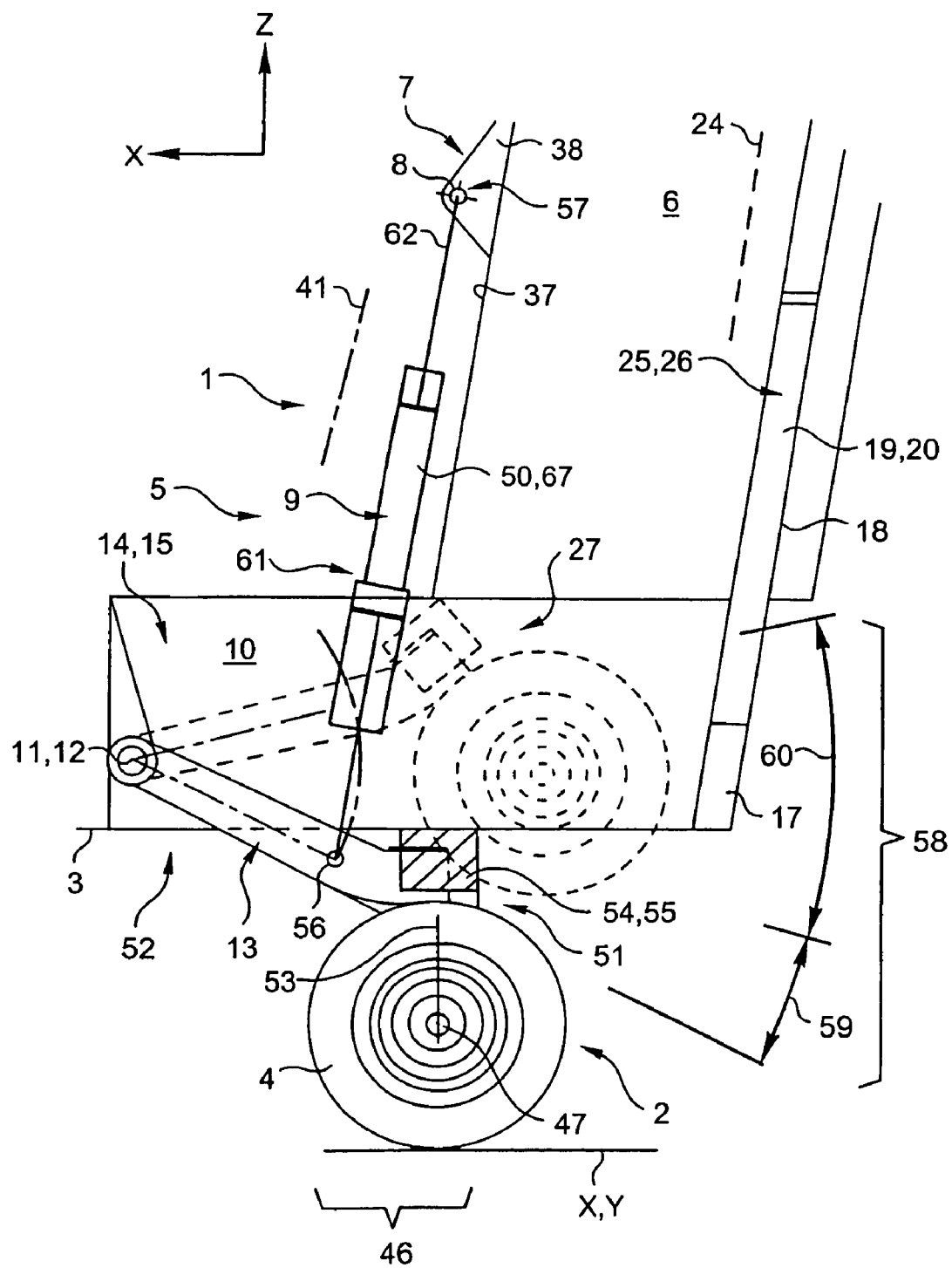
FIG. 1 is a fragmentary diagrammatic longitudinal elevation view showing an embodiment in accordance with the invention of nose undercarriage and of a force-transmission structure, the nose undercarriage being drawn in dashed lines in its retraction position, and in uninterrupted lines in its extended position.

In the various figures, elements that are similar are designated by the same reference numerals.

The figures show three mutually orthogonal directions, X, Y, and Z.

X designates a longitudinal direction corresponding to the main lengths or dimensions of the structures described.

Y corresponds to a transverse direction, corresponding to the lateral dimensions or widths of the structures described; these longitudinal and transverse directions X and Y are sometimes said to be the horizontal directions, for simplification purposes.

Z designates a third or "elevation" direction corresponding to the height dimensions of the structures described: the terms high/low are relative thereto; for simplification purposes, this Z direction is sometimes said to be vertical.

Together the directions X and Y define an X, Y plane referred to as a "main" plane (perpendicular to the plane of the sheet of FIG. 1) within which there is inscribed the polygon of support and a landing plane.

In the figures, reference 1 is a general reference to a rotary wing aircraft such as a rotorcraft.

In FIGS. 1 to 4, the X direction arrow points forwards relative to the aircraft 1. When a component of the aircraft 1, such as an undercarriage or landing gear 2 is placed close to a longitudinal end of the aircraft 1 close to its front end, the component is said to be a "nose" component.

By way of illustration, in the example shown, the aircraft 1 is a "medium" helicopter, i.e. a helicopter weighing about 5 to 8 (metric) tonnes.

Figure 2:
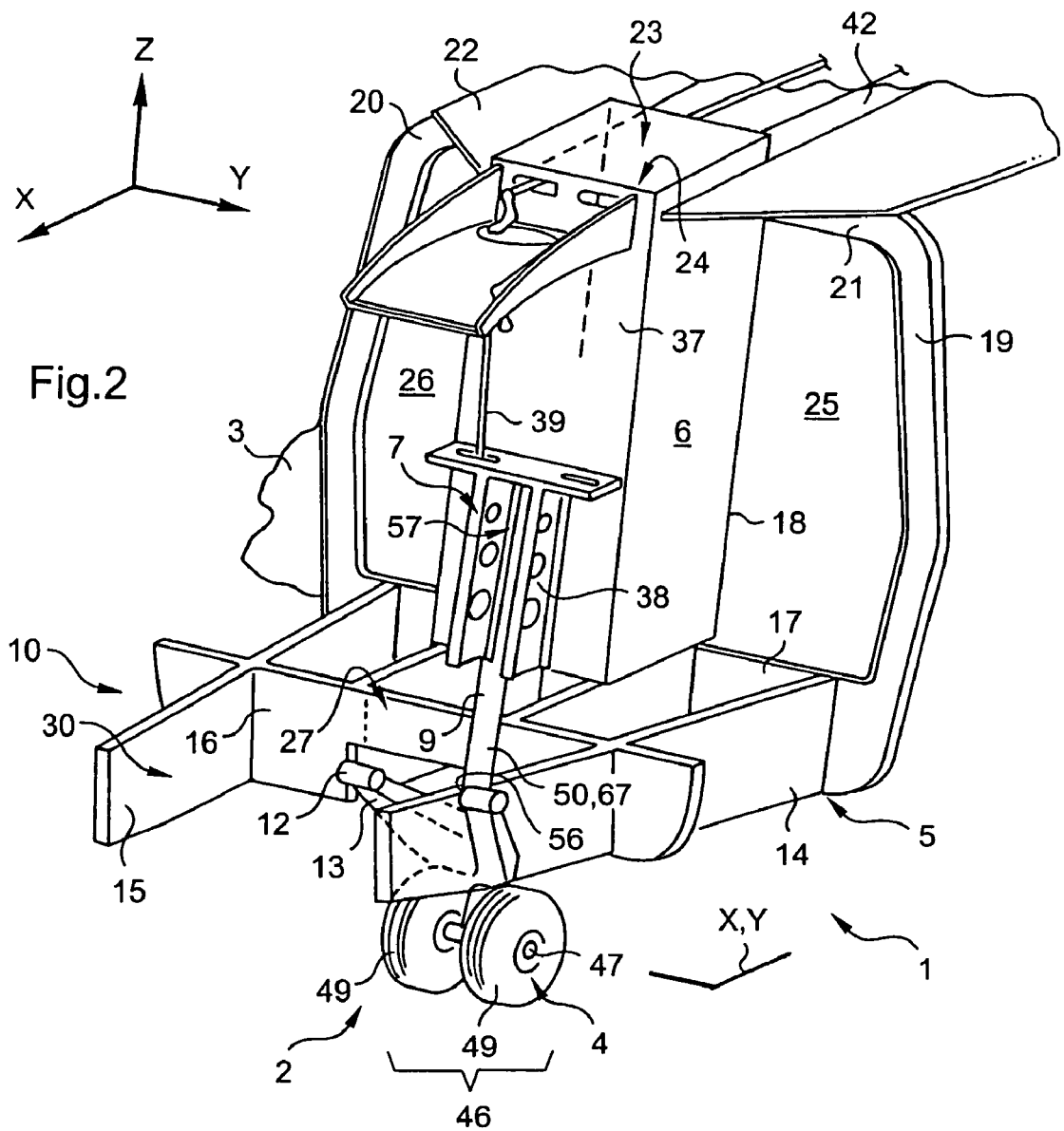
FIG. 2 is a fragmentary diagrammatic perspective view of the nose showing a force-transmission structure together with a nose undercarriage in accordance with the invention.

Within the helicopter 1, and as shown in particular in FIG. 2, there can be seen a force-transmission structure 5. Such a structure 5 provides the fuselage 3 of the aircraft 1 with a high degree of rigidity and with safe behavior in the event of a crash.

The structure 5 forms a rigid arrangement comprising a box 6 that is centered transversely and that extends substantially along the elevation direction Z.

In FIGS. 1 and 2, this box 6 possesses at least one anchor point 7 for receiving a hinge 8 of a shock-absorbing actuator 9 of the landing gear 2.

Embodiments of the invention provide for two shock-absorbing actuators 9 (e.g. in parallel, either horizontally or vertically), even though the examples shown have only one shock absorber.

The structure 5 also has a structural bottom floor 10 constituting the cabin floor.

In practice, it should be observed that a distinction is drawn between a genuine cabin floor—i.e. surfaces that serve to support occupants and cabin equipment on-board—and an "under-floor" structure that supports the major fraction of the mechanical forces.

The genuine cabin floor is designed to withstand puncturing and at present is often constituted by a leaktight composite honeycomb assembly.

Longitudinal spars 14-15 and transverse spars 16-17 of the structural bottom floor 10 are components of such an "under-floor structure".

As explained below, the structural bottom floor 10 in the embodiments of FIGS. 5 and 6 supports the anchor point 7 of a hinge 8 of the shock-absorbing actuator 9.

This structural bottom floor 10 of the cabin is provided with at least one other anchor point 11.

This anchor point 11 receives a hinge 12 of an oscillating system 13 for suspending and retracting the landing gear 2.

In FIG. 2, the structural bottom floor 10 possesses two longitudinal spars 14 and 15. These spars extend substantially in the longitudinal direction X, forwards from the bottom base of the rigid arrangement or box 6, being disposed transversely on either side of the box 6.

This structural bottom floor 10 also possesses two transverse spars 16 and 17.

The transverse spars 16 and 17 are disposed substantially perpendicularly to the rigid arrangement and longitudinally they are disposed:

one of them, 16, in front of the box 6; and the other one of them, 17, substantially in register with a rear face 18 of the rigid arrangement.

The transverse spar 17 visible in FIG. 1 is in register with the rear face 18 of the box 6.

In FIG. 2, it can be seen that in order to form a kind of open transverse frame, there are provided two lateral arms 19 and 20 that form parts of the rigid arrangement.

These lateral arms 19 and 20 of the structure 5 extend generally in elevation, i.e. substantially in the elevation direction Z, from the rear transverse spar 17 in an upward direction.

In FIGS. 1 and 2, the rigid arrangement constitutes a single piece.

For this purpose, the lateral arms 19 and 20 are integrated with the rear transverse spar 17 of the structural bottom floor 10, and also with a transverse top beam 21.

The top beam 21 is substantially parallel to the spar 17 but is opposite therefrom in elevation, extending over the top ends of the lateral arms 19 and 20 which it unites.

In addition, the structure 5 includes a machine top floor 22.

Figure 4:
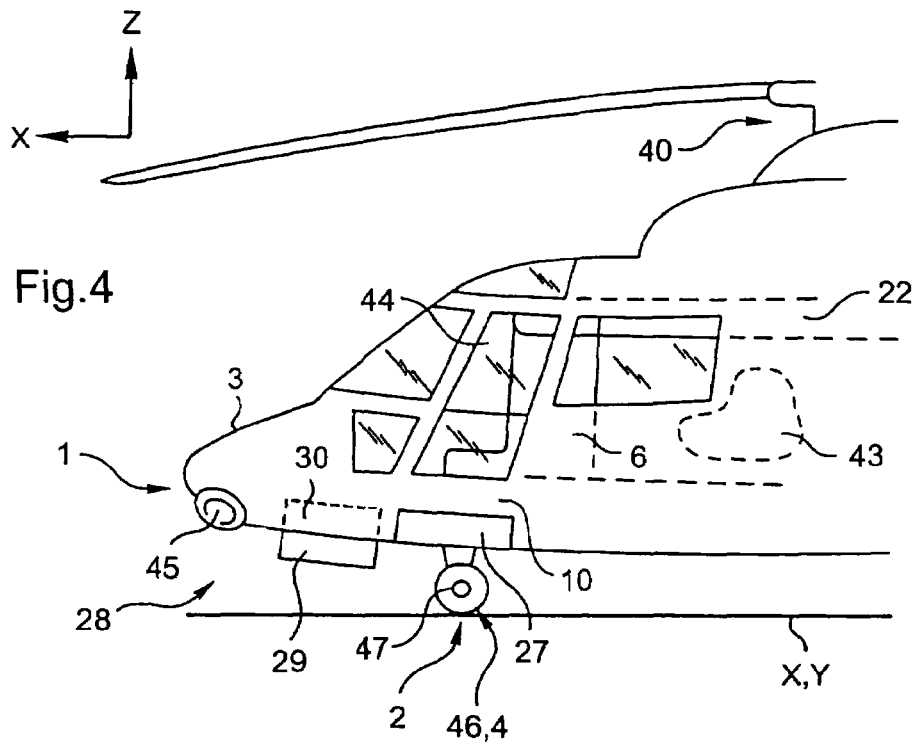
FIG. 4 is a fragmentary diagrammatic view in longitudinal elevation of a rotary wing aircraft in accordance with the invention, showing an example of a tactical radar and an infrared detector being disposed ahead of the nose undercarriage.

It should be observed that the term "floor" is used in its meaning that is typical for rotorcraft, which for a machine top floor 22 designates a plate for supporting the main mechanical units, including, for example:

a turbine;

a transmission unit; and a main rotor (40 in FIG. 4).

In FIG. 2, the machine top floor 22 is rigidly secured to the central box 6, close to the top ends of the box, the lateral arms 19 and 20, and the top beam 21.

As can be seen in FIG. 1, when the structure 5 is seen in longitudinal elevation view (i.e. in a plane coinciding with the plane of the sheet in FIGS. 1, 3, and 4) it presents a shape that is generally L-shaped.

In this L-shape, the central box 6 forms the vertical limb of the L-shape, while the structural bottom floor 10 forms the limb at the bottom of the letter.

In other words, the box 6 and the lateral arms 19 and 20 extend substantially in the elevation direction Z while the structural bottom floor 10 extends substantially from said box 6 and the arms 19 and 20 substantially longitudinally (X direction) towards the front.

It is emphasized at this point that the structural bottom floor 10 is rigidly connected to the box 6, giving the L-shaped structure 5 of the invention its ability to transmit to the airframe of the aircraft 1 the loads that come from the landing gear 2.

In structures 5 of the invention, the box 6 and/or the structural bottom and machine top floors 10 and 22 are made at least in part out of composite material. In some examples, these are elements made of carbon/carbon sandwiches connected together by rivets and adhesive.

In FIG. 2, the box 6 presents a profile that is open at least in part both in longitudinal section and in cross-section, having at least one opening 23 that opens out rearwards in such a manner as to provide at least one housing 24 (also visible in FIG. 1).

This housing 24 forms a "cupboard" of the central structure (see FIG. 4 for example), which in this example is located a little behind the crew and connects the structural bottom floor 10 to the machine top floor 22.

As mentioned, this housing 24 is open via its rear face 18, longitudinally relative to the passenger cabin, so as to house electrical harnesses and/or avionics equipment, for example.

It should be observed that the panel of the rear face 18 is not subjected to high levels of stress, i.e. it is not a "working" member, and as a result the presence of the opening 23 does not lead to mechanical weakness in the box 6, and thus the force-transmission structure 5.

At this point, it should be observed that the lateral arms 19 and 20 of the empty rigid frame of the structure 5 extend in the Y direction transversely on either side of the box 6, being spaced apart from each other.

This leaves respective internal passages 25 and 26 open on either side of the aircraft 1 for moving and looking between the front and rear portions of the cabin, which portions are separated by the frame (17, 19, 20, 21) of the structure 5.

This thus reconciles the requirement for the fuselage to be rigid, i.e. to provide safety in the event of a crash, and the requirement that was previously believed to be contradictory for good visibility and the ability to move between portions of the cabin.

In the embodiment of FIG. 1 or 2, the force-transmission structure 5 includes a well 27 substantially level with the structural bottom floor 10, which well 27 is suitable for having the landing gear 2 retracted into it, and is sometimes also known as a wheel bay.

In this example, the well 27 extends longitudinally from the front transverse spar 16 of the structural bottom floor 10 to level with the rear end of the central box 6.

In this example, the well 27 has substantially the same transverse dimensions (in the Y direction) as the box 6.

In FIGS. 1 and 2, it can be seen that the well 27 is for the most part integrated in the structural bottom floor 10.

In particular embodiments, the well 27 is completely integrated in the bottom floor 10.

Thus, landing forces are distributed between the structural bottom floor 10 and the machine top floor 22, as can be seen more clearly in FIG. 3 (described in greater detail below).

In FIG. 4, there can be seen navigation and/or tactical equipment 28, mounted on the structure 5 of the aircraft 1.

For example, this equipment 28 comprises a radar 29 retractable into a space 30 formed within the structural bottom floor 10 in a manner that is similar to the space for the undercarriage 2, but longitudinally nearer to the nose of the aircraft 1.

Figure 3:
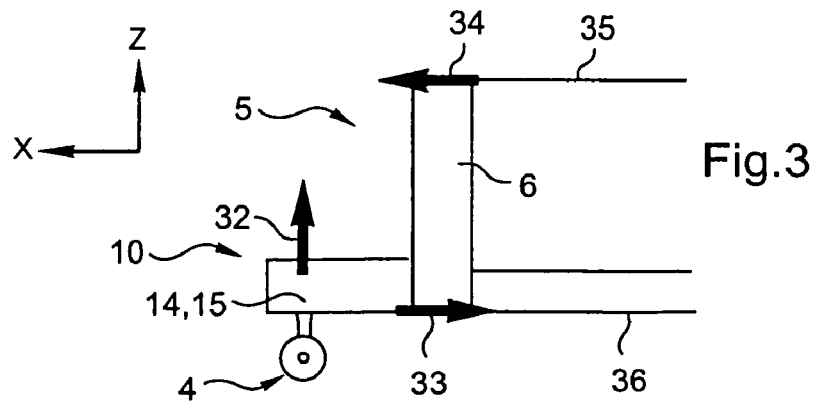
FIG. 3 is a fragmentary diagrammatic elevation view in longitudinal section showing an example of a force-transmission structure in accordance with the invention, and the distribution of stresses within said structure.

With reference to FIG. 3, there can be seen the forces and stresses that are applied to the force-transmission structure 5, both in normal operation of the aircraft 1 in which the structure 5 is installed, and in the event of an emergency landing.

In particular because of the way the box 6 is integrated to act as a central structural post for the structure 5 (a back-to-front L-shape in FIGS. 1 to 3), it is possible to embed the beams of the wheel well 27 by finding suitable bearing points against the machine top floor 22.

As a result, the structure 5 is provided with increased rigidity longitudinally (X) towards the front of the box 6.

In the example of FIG. 4, this increased rigidity is obtained under the pilot's seat or cockpit.

Consequently, the masses that the structure 5 supports cantilevered out from the body 3 are also better integrated because of this improved rigidity.

This also makes it possible to reduce the load on the two load-carrying longitudinal spars 14 and 15.

By way of illustration, there can be seen in FIG. 3:

a moment created by a force 32 generated by the landing gear 2;

bottom and top shear forces 33 and 34; and top and bottom segments 35 and 36 of the skin or covering of the fuselage 3.

In this example, the force 32 generated by the landing gear 2 is directed substantially upwards in the elevation direction Z.

The bottom shear force 33 is directed substantially rearwards along the longitudinal direction X.

The top shear force 34 is directly substantially forwards along the longitudinal direction X.

It can clearly be seen in FIG. 3, that by means of the L-shaped structure 5 connected to the machine floor 22, the moment delivered by the force 32 is balanced in part or even completely by the shear forces 33 and 34 in the top and bottom covering segments 35 and 36.

Other features of the force-transmission structure 5 are described below.

In FIG. 2, it can clearly be seen that the box 6 does not come adjacent to the side walls of the fuselage 3, but leaves empty spaces via the two passages or openings 25 and 26.

Consequently, the point where forces are applied is not close to the walls of the fuselage 3, but is above the landing gear 2, which in this example is placed in a central position, being centered transversely in the Y direction.

In FIG. 2, outside the box 6 and on a front face 37 there is installed a hinge plate 38 for the shock-absorbing actuator 9 of the landing gear 2.

Also, one or more rods 39 (only one rod 39 is shown in FIG. 2) for controlling the main rotor 40 (FIG. 4) are installed outside the box 6, in front of and close to its front face 37.

In FIG. 1, the plate 38 and the rods 39 are covered by a fairing 41 (diagrammatically represented by a chain-dotted line).

In the embodiment of FIG. 2, the width, i.e. the dimension in the transverse direction Y, of the box 6 or central post is substantially equal to that of the wheel well 27 (e.g. being about 500 millimeters (mm)), and also equal to the width of an equipment panel situated between the pilot and the co-pilot.

Likewise, the transverse dimension of the box 6 is substantially equal to that of a central panel 42 of the machine floor 22 which also carries equipment and auxiliary controls (e.g.: a fuel shut-off valve, a rotor brake, or engine controls).

As an image, it can be said that the structure 5 is L-shaped longitudinally while being substantially upside-down T-shaped transversely (e.g. when seen from in front).

In an embodiment, the main parts of the structure 5 can be considered as being beams made up of two flanks made from rectangles.

The bottom rectangle defines the well and the vertical rectangle defines access to the cockpit.

Such a structure enables forces to be transmitted from the landing gear 2 and enables those forces that are not taken up by the structure 5 to be shared with the coverings of the fuselage 3.

In certain embodiments, such a central box 6 thus serves:
to hold the front of the machine top floor 22, in particular when anti-crash troop seats are secured to said machine top floor; and
stiffen the structure 5, and thus the aircraft 1, while taking load from the load-carrying longitudinal spars 14 and 15 on either side.

Certain practical aspects of the structure 5 should be considered in terms of how the cabin is used:
since the central box 6 is relatively narrow (e.g. about 0.5 meters (m) wide) compared with the fuselage 3 in the location of the cabin (e.g. 2 m wide), the box constitutes only a small mask in the forward direction for the passengers, whereas a conventional configuration with a central passage and with equipment bays on either side obstructs the forward view, often in unacceptable manner; and via its sides, the central box 6 provides easy and fast (i.e. practical) access to a first row of passenger seats (e.g. the passenger seat 43 drawn in dashed lines in FIG. 4) via doors (from inside the aircraft 1 via the passages 25 and 26) situated longitudinally (X direction) towards the front of the aircraft 1, e.g. a front door 44 as shown in FIG. 4.

In embodiments of the invention, these practical aspects of the structure 5 make it possible to provide cabins having four rows of seats of modest size (e.g. 1.4 m) in elevation (Z), since all of these rows are accessible without moving longitudinally (X) in the cabin.

Conventionally, in order to be able to move in this way, it is necessary to have at least 0.2 m of additional elevation (Z), thus losing available area on the floor 10 that would otherwise be useful for installing seats.

In aircraft 1 of the invention and intended for military missions, the L-shaped and T-shaped disposition enables a commando leader to communicate (via the passages 25 and 26) with the crew and specify the best landing site on a field of operation.

Also, the way the structure 5 is disposed leaves room for machine guns to be used via portholes, whereas in many conventional configurations, such movements are impeded.

In addition to those aspects, FIG. 2 shows how the following items present the same width:
the central box 6;
the well or wheel bay 27; and
the equipment and ceiling panels.

This makes it naturally easy to install vertically-extending electrical harnesses, hydraulic pipework, or the like.

In numerous embodiments, the dimensioning of the panels constituting the structure 5 is designed to ensure that webs are positioned at the margins of the panels.

Furthermore, the internal dimensions of the elements of the structure 5 enable avionics equipment to be housed therein, and makes it easy for the equipment to be ventilated (e.g. by taking in air from below and exhausting it upwards).

It is also easy to ensure sealing relative to the cabin.

In embodiments of aircraft 1 in accordance with the invention that are intended for naval missions, and as shown in FIG. 4, the navigation and/or tactical equipment 28 includes an infrared detector device 45 located longitudinally in front of the radar 29.

Like the tactical radar 29, the infrared detector device 45 is installed in front of the landing gear 2.

Thus, the infrared detector device 45 has a good field of view which may even be total in a forward direction and in a downward direction, and the radar 29 can look over 360° in a horizontal plane in most flight configurations.

For this purpose, care is taken in an aircraft 1 of the invention provided with a radar 29 to ensure that the radar has good visibility in particular sideways while turning and possibly also upwards a little in the forward direction so as to enable it easily to take on weather radar functions.

In FIG. 4, the radar 29, which is retractable into the space 30, improves the ground clearance of the aircraft 1 and reduces aerodynamic drag when the radar 29 is not active.

It is in particular the way in which the landing gear 2 of the invention is compact in the longitudinal direction (X) that makes it easy to provide a space 30 of dimensions that are sufficient to enable the major part of the radar 29 antenna and its radome to be retracted while flying with the radar off, or when on the ground.

In FIG. 4, the space 30 is disposed longitudinally between the infrared detector device 45 and the undercarriage 2.

This is advantageous, in particular when turning, since the device 45 is then in a low position, and because the device 45 is installed in a zone of the fuselage 3 that presents smaller width transversely.

In addition, on the ground, neither the radar 29 nor the infrared device 45 interfere with handling the aircraft 1 with a tow bar connected to its nose gear 2.

There follows a description in greater detail of the undercarriage or landing gear 2 of the invention.

The undercarriage 2 is for use with an aircraft 1 and is retractable substantially by moving rearwards.

In general, the undercarriage 2 comprises at least one wheel set having a wheel axle 47 about which at least one wheel 4 revolves with a flange and a tread 49 formed in FIG. 1 or 2 by means of a pneumatic tire.

The undercarriage 2 also possesses an oscillating system 13 with the wheel axle 47 being mounted close to a longitudinally rear free end 51 of the oscillating system 13.

Opposite from the free end 51 in the longitudinal direction X, the oscillating system 13 has a hinged front end 52 pivotally mounted on the structure 5 of the aircraft 1.

At this point, it is recalled that the structure 5 is rigidly secured to the aircraft 1.

In FIGS. 1 and 2, the hinge 12 mounts the oscillating system 13 to the structure 5 to pivot about a transverse axis, and more precisely relative to the structural bottom floor 10, as described above.

In order to reduce or eliminate any offsets that make it difficult to steer the undercarriage 2, provision is made for the wheel axle 47 of the wheel assembly 46 to be mounted on the oscillating system 13 via a steering pivot 54 (represented diagrammatically by shading in FIG. 1) with a steering axis 53 intersecting the axis of the wheel axle 47.

This steering pivot 54 makes it possible to steer the wheel 4 or allow it to swivel on either side of a position corresponding to the aircraft 1 running in a straight line.

A steering actuator 55 (also represented diagrammatically by shading in FIG. 1) also forms part of the undercarriage 2.

The steering actuator 55 is connected to a portion of the steering pivot 54 that is constrained to turn with the wheel axle 47 so as to steer the wheel 4 on either side of a position for running in a straight line.

In FIG. 1, the steering pivot 54 and the steering actuator 55 are both substantially integrated around the steering axis 53.

In this example, the steering actuator 55 includes an electric motor whose outlet is geared down to a great extent, e.g. with gearing.

A moving pin of the steering actuator 55 that is driven for steering purposes is connected to the portion of the steering pivot 54 that is secured to the wheel axle 47.

Another pin, that does not move for steering purposes, is secured to the oscillating system 13.

In an embodiment of the invention, in order to enable movements to be performed on the ground by means of a towing tractor, the steering actuator 55 is declutchable.

It should be observed that in spite of its relatively high cost, using an actuator 55 presents advantages, in particular compared with a configuration for the landing gear 2 in which the wheel 4 is offset. Thus, it is easy to use landing gear 2 of the invention provided with an actuator 55 to ensure that:

the wheel 4 can easily be locked on the aircraft axis (in flight) e.g. by interrupting the (electrical or other) power supply to the actuator once the wheel 4 has been retracted into the wheel bay or well 27 and turned to lie on the axis of the aircraft 1; in contrast, for an ordinary landing gear with an offset wheel, in order to achieve the same result it is necessary to provide it with a specific locking mechanism;

it is easy to return the wheel 4 to the axis of the aircraft using the actuator 55 while the wheel is being retracted into its well or bay 27; in contrast, with ordinary landing gear having a trailed wheel, it is necessary to add a specific mechanism (e.g. springs) to achieve the same result;

the shimmy phenomenon is prevented because of the angular stiffness specific to the actuator 55; however, ordinary landing gear with an offset wheel is sensitive to this phenomenon; and for a given aircraft 1, the longitudinal dimension of the entire landing gear 2 of the invention can easily be made smaller than that of ordinary landing gear having an offset wheel.

Figure 6:
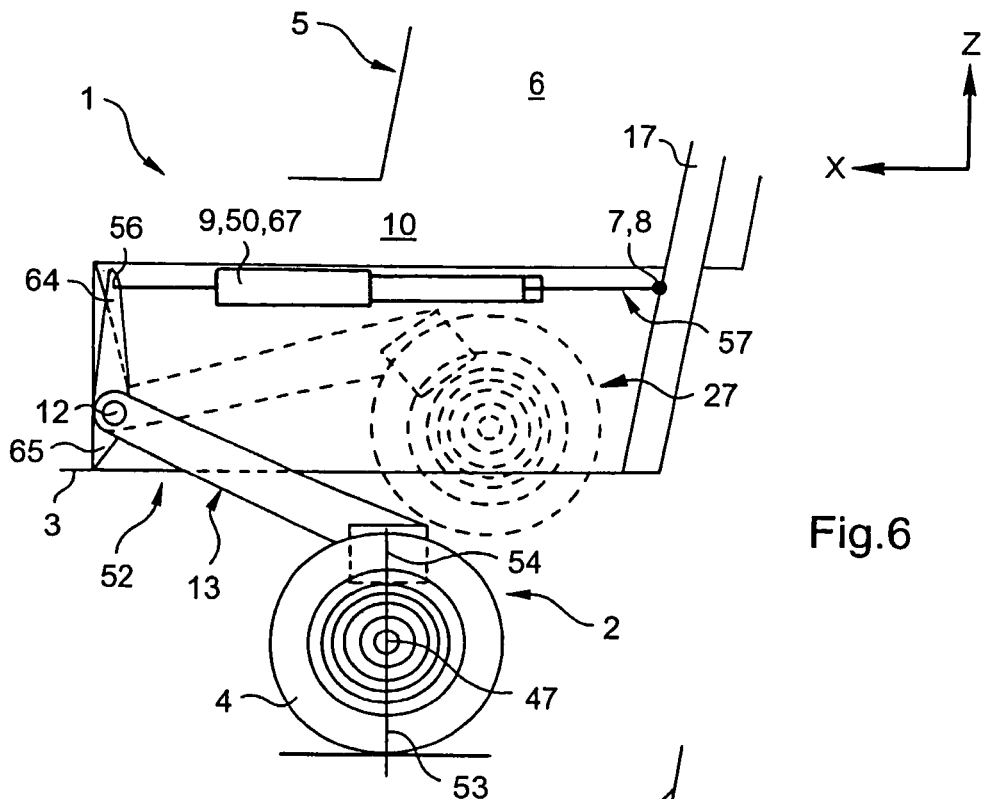
FIG. 6 is a fragmentary diagrammatic section view in longitudinal elevation showing an example of a longitudinal shock absorber housed in the wheel well, the hinge of the shock absorber being close to the hinged front end of the system.

In FIG. 6, in order to avoid interference between the cylinder of the shock-absorbing actuator 9, it can be seen that the actuator 55 is installed further down on the steering pivot 54 (i.e. closer to the wheel axis 47) than in the embodiment of FIG. 1.

In this example, the actuator 55 is offset transversely to one side of the steering pivot 54, for the same purpose.

Returning to the examples of FIGS. 1 and 2, it can be seen that the shock-absorbing actuator 9 is an oleostrut.

A connection end 56 of the shock-absorbing actuator 9 is hinged to the oscillating system 13 close to the longitudinally rear free end 51 between said free end 51 and the hinged front end 52 of the oscillating system 13.

Conventionally, opposite from its connection end 56, the shock-absorbing actuator possesses a coupling end 57 hinged in the example of FIG. 1 to the plate 38 that is rigidly mounted on the box 6 of the force-transmission structure 5.

That constitutes a "rocker" arm undercarriage 2 with a trailed wheel that is retractable and steerable.

As this stage, mention can be made briefly of various known undercarriages and of the drawbacks they can present under certain circumstances.

Landing gear can be straight, typically with a rod when stationary or with a retracting actuator when retractable. In general such landing gear does not provide an anti-crash protection.

Nevertheless, in order to obtain an anti-crash undercarriage, some aircraft are sometimes provided with a device having a composite tube (e.g. made of carbon) which collapses while opposing a substantially constant force. Such a device is similar to that shown in FIG. 7, as described below.

With such a device, the shock absorber becomes blocked at the vertical travel speeds typical of a crash (NB.: about 8 meters per second (m/s) to 11 m/s, as opposed to a speed that is usually less than 1 m/s during a normal landing).

For this purpose, the undercarriage, or more generally the aircraft, is fitted with sensors and appropriate processor units which, for example, act on dedicated means 61 that are described below.

With the landing gear leg pivoting to take up a flat position, a phenomenon of the tires collapsing instantaneously can lead to large amounts of damage to humans and/or equipment, if the landing gear strikes the bottom floor hard.

It is appropriate to observe that retractable landing gear with a direct shock absorber is suitable for helicopters of relatively high weight (e.g. in excess of 8000 kilograms (kg)), since the ground clearance of such aircraft 1 is generally greater than 500 mm, and the floor of the cockpit is higher than the floor of the cabin.

However, that solution is difficult to apply to aircraft of lower tonnage, for reasons of bulk.

Thus, the minimum dimensions needed for the wheel well can be about 1450 mm in length and 500 mm in height.

Nose landing gears of another type are also known. Such landing gear is often used on low-tonnage helicopters.

A lever is then used to shorten the stroke of the shock absorber relative to the vertical stroke of the center of the wheel 4.

Such landing gear can be non-retractable or retractable.

With this type of landing gear it is still not possible to reduce the dimensions of the wheel bay or the height of the landing gear when extended, in order to fit in a given floor.

The floor lies under the cockpit and extends the floor of the cabin, and ground clearance is proportional to the size of the aircraft.

The minimum dimensions of the wheel well are clearly smaller when not using such a landing gear, for example about 1100 mm in length and 400 mm in height.

Because of an offset between the axis of the wheel and its steering pivot that is often large, this type of landing gear makes it easy to turn while running on the ground by acting on the tail rotor or by braking the main wheels differentially. Such landing gear is also compact.

However it leads to a weight penalty and a penalty in terms of manufacturing costs.

Furthermore, its position set back rearwards relative to the aircraft 1 generally requires overall stability to be restored at the main landing gear.

In practice, such landing gear is used only when anti-crash functions are not required, since it leads to the same difficulties as straight landing gear.

In addition, this kind of landing gear runs the risk of the wheels taking up a sideways position under the effect of lateral forces and striking one of the beams of the wheel bay making it impossible to retract the landing gear leg.

The specific features and advantages of landing gear in accordance with the invention can be better understood in the light of the above.

In FIG. 1, it can be seen that the undercarriage 2 of the invention is arranged in such a manner that the oscillating system 13 moves through a maximum elevation stroke 58 about its hinged front end 52 that is greater than its shock-absorbing stroke 59 (see FIG. 1 in particular).

In other words, when operating on the ground, the shock-absorbing actuator 9 allows the oscillating system 13 to move through a shock absorbing stroke 59 between a low position and an end-of-shock absorption or top abutment position.

Such a shock absorbing stroke 59 is provided for the purposes of stabilizing the aircraft 1 and also of providing comfort.

When retracting, the shock-absorbing actuator 9 allows a total elevator stroke 58 that is said to be a "maximum" stroke.

The total elevation stroke 58 is to allow the undercarriage 2 to be retracted into the well 27.

Thus, the amplitude of the elevation stroke 58 is greater than that of the shock absorbing stroke 59 for operating on the ground, by an amount referred to as the additional amplitude and referenced 60 in FIG. 1.

This additional amplitude for the undercarriage 2 extends from the end-of-shock-absorbing position to a retracted position.

The high and low end-of-stroke abutments for shock absorbing and retracting are not shown. In some embodiments, a shock-absorbing stroke 59 can be provided (in elevation in the Z direction) that is about 200 mm.

For retraction purposes, the shock-absorbing actuator 9 possesses means 61 that are dedicated thereto, that enable it to travel through a stroke beyond the position of the high abutment of the oscillating system 13. Activating these retraction means 61 cause the landing gear 2 to be retracted into the well 27.

In the event of a crash, sensors and processor units of the aircraft 1 can act on the dedicated means 61 in order to inhibit retraction of the shock-absorbing actuator 9 and limit the forces transmitted to the structure 5.

It can thus be understood that in this undercarriage 2 in accordance with the invention, the oscillating system 13 and the shock-absorbing actuator 9 perform both the function of absorbing shocks and the function of retracting the undercarriage 2.

These functions can be associated with a specific anti-crash function, as described below.

In FIGS. 1 and 2, the oscillating system 13 is a trailed single-arm vertical rocker arm, as compared with landing gear 2 comprising a deformable parallelogram.

In this example, the wheel axle 47 of the wheel set 46 is substantially stationary in the longitudinal direction and in the elevation direction relative to the longitudinally free end 51.

In addition, when the single arm is rocking functionally, the wheel axle 47 follows a curvilinear shock-absorbing path.

In these examples, it should be observed that the connection end 56 and the coupling end 57 of the shock-absorbing actuator 9 are hinged via ball joints, respectively to the oscillating system 13 and to the structure 5.

The shock-absorbing actuator 9 in this example is subjected to stress mainly along its sliding axis 62 (FIG. 1).

In FIG. 1, the sliding axis 62 and the strut of the shock-absorbing actuator 9 extend substantially in the elevation direction Z, with its coupling end 57, then referred to as its top end, being hinged to the central box 6 of the structure 5.

To be more precise, as can be seen in FIG. 1 the shock-absorbing actuator 9, which in this case extends substantially in the elevation direction Z, slopes a little relative to said direction Z, sloping rearwards on going upwards.

Figure 5:
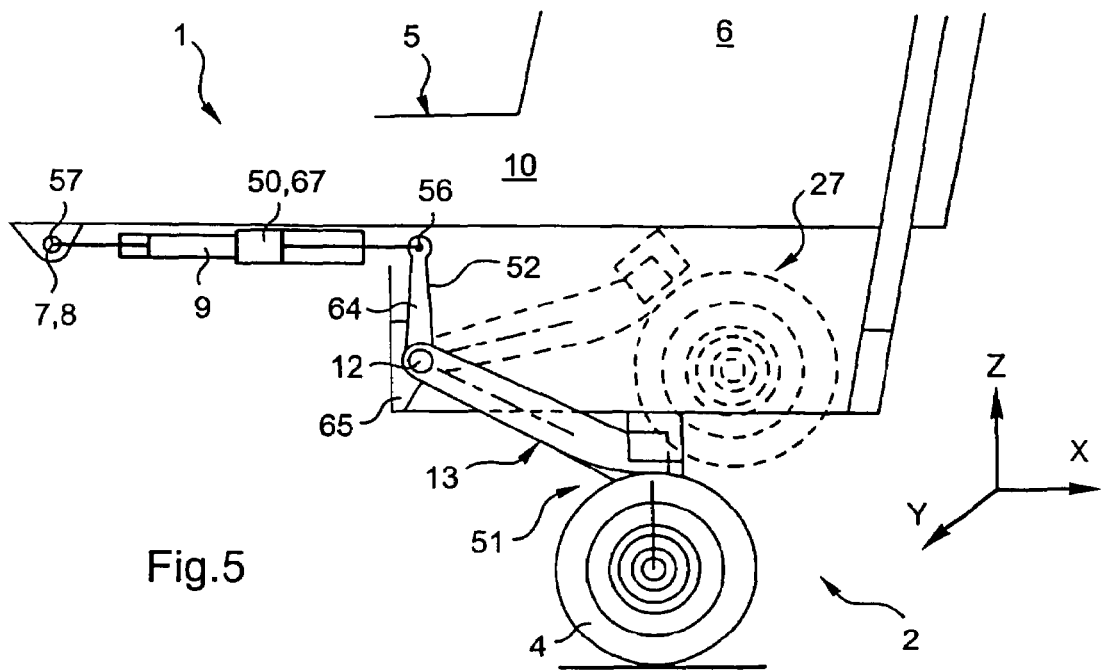
FIG. 5 is a fragmentary diagrammatic section view in longitudinal elevation showing an example of a shock absorber that extends substantially longitudinally, being hinged to a reinforced bottom floor of the structure, and to the system via a crank fitting, its coupling end projecting longitudinally from the wheel well in a forward direction.

In contrast, in the examples shown in FIGS. 5 and 6, the shock-absorbing actuator 9 extends substantially in the longitudinal direction X.

To summarize, the undercarriage 2 having a substantially longitudinal shock-absorbing actuator 9 in FIGS. 5 and 6 has its coupling end 57 hinged to the reinforced structural bottom floor 10 of the structure 5, while the connection end 56 thereof is associated with a crank fitting 64 or the like of the oscillating system 13.

In FIG. 6, the shock-absorbing actuator 9 is housed in the well 27 and the connection end 56 is close to the hinged front end 52 of the oscillating system 13.

In contrast, in FIG. 5, the shock-absorbing actuator 9 has its coupling end 57 in front of the connection end 56, which connection end is disposed in the well 27.

The coupling end 57 projects longitudinally from the well 27 forwards the X direction (i.e. to the left in FIG. 5).

This is similar to the situation shown in FIGS. 1 and 2 in which the shock-absorbing actuator 9 extends substantially in elevation (Z) and projects upwards beyond the well 27.

It should be observed that such a shock-absorbing actuator 9 takes on a small slope on being retracted or on absorbing shock, or vice versa, either:

upwards and rearwards; or else downwards and rearwards.

When the structure 5 (i.e. the floor 10 in FIG. 1, and a front partition comparable to the transverse spar 16 in FIG. 5) possesses an opening for passing the shock-absorbing actuator 9, the dimensions of the opening must be sufficient to allow the shock absorber to tilt in this way.

On the same lines, it can be seen in FIG. 2 that the hinge 12 of the oscillating system 13 lies outside the well 27. The transverse spar 16 has an opening for passing the front of the system 13.

When they are on top (e.g. in a "horizontal" partition like the floor 10), such system-passing openings can contribute to reducing the ground clearance of the aircraft 1.

For a front system-passing opening (e.g. in a "vertical" partition such as the transverse spar 16), it is possible to adjust the longitudinal (X) position of the undercarriage 2 as a function of the stresses to which the aircraft 1 is subjected, such as those involved in achieving balance on the ground.

Compared for example with a known landing gear, the invention thus enables the landing gear to be positioned better.

Also, a front system-passing opening, by disengaging the wheel well 27, can contribute to reducing the ground clearance of the aircraft 1.

In FIGS. 5 and 6, the coupling end 57 is hinged to a reinforced member 65 of the force-transmission structure 5. This member 65 is distinct from the box 6, and forms part of a transverse front face of the well 27. In this case it is integrated in the structural bottom floor 10.

It can also be seen in FIGS. 5 and 6 that the connection end 56 is associated with a crank fitting 64 or the like, itself pivotally mounted on the member 65 via a transverse hinge 12.

In the embodiment of FIG. 6, the substantially longitudinal shock-absorbing actuator 9 is arranged so as to be housed essentially in the well 27 into which the undercarriage 2 is retracted.

In the embodiment of FIG. 5, the shock-absorbing actuator 9 extends substantially longitudinally with its coupling end 57 in front of its connection end 56.

In the embodiment of FIG. 6, the shock-absorbing actuator 9 extends longitudinally with its coupling end 57 behind its connection end 56.

During retraction of the shock-absorbing actuator 9, it pivots slightly, such that during certain stages of its operation it presents the following:

in the example of FIG. 6, a small slope that is upwards and rearwards; and in the example of FIG. 5, a small slope that is downwards and rearwards.

Figure 7:
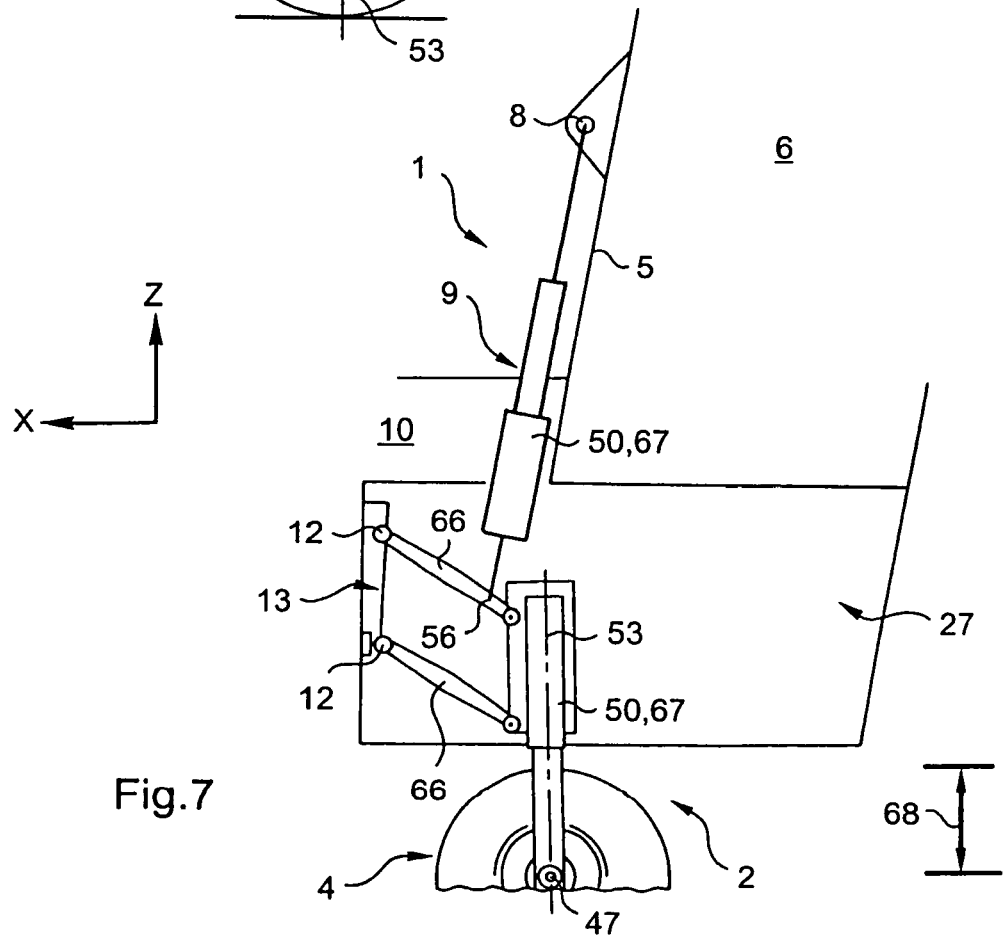
FIG. 7 is a fragmentary diagrammatic section view in longitudinal elevation showing an example of an oscillating system comprising a deformable parallelogram with trailed arms disposed one above the other in elevation, with crash force limitation means being integrated in the oscillating system.

In the variant shown in FIG. 7, the oscillating system 13 is a deformable parallelogram so that the steering pivot 54 has its steering axis 53 maintained to extend substantially along the elevation direction Z between the high and low abutment positions of the oscillating system 13.

In FIG. 7, the deformable parallelogram comprises a pair of trailed arms 66 disposed one above the other in elevation (Z).

Each arm 66 is connected to the structure 5 via an anchor hinge 12 that is separate from the hinge of the other trailed arm.

Similarly to the examples of FIGS. 5 and 6, in FIG. 7, the hinges 12 are arranged on a transverse front face of the landing gear well 27.

It should also be observed in these three embodiments that the transverse anchor hinge 8 of the shock-absorbing actuator 9 is disposed substantially in register with the box 6, and more precisely:

on the box 6 in FIG. 7;

under the box 6 and connected to the structural bottom floor 10, in FIG. 5; and slightly in front of the front face 37 of the box 6 (in the longitudinal direction X) in FIG. 5.

Returning briefly to FIG. 1, it can be seen that the wheel set 46 possesses at least one wheel 4.

Its flange and its tread 49 come in elevation (Z) substantially up to the rear free end 51 of the oscillating system 13.

In the example of FIG. 2, it can be seen that this wheel set 46 possesses two wheels 4 located in parallel with a substantially common wheel axle 47, these wheels 4 being disposed transversely along the Y direction on either side of the rear longitudinal free end 51.

Such a configuration is useful for minimizing the diameter of the wheels 4 relative to the vertical dimension of the well 27.

According to an advantageous aspect, the undercarriage 2 of the figures also presents a specific mode of operation in the event of a crash.

To summarize, it can be understood that the undercarriage 2 presents:

means 50 that operate specifically in the event of a crash, that are adapted in the event of a crash to inhibit the retraction function and possibly also the shock-absorption function of the shock-absorbing actuator 9; and force-limiter means 67 for limiting forces in the event of a crash and arranged so that once retraction and possibly also shock absorption has been inhibited, the energy of the crash causes the oscillating system 13 to rise through the additional amplitude 60, or the shock-absorbing stroke 59, with forces being absorbed by said force-limiter means 67.

In embodiments, the inhibitor means 50 and the force-limiter means 67 are integrated in the shock-absorbing actuator 9.

However the force-limiter means 67 could be integrated in part in the shock-absorbing actuator 9 and in part in the oscillating system 13.

In embodiments that are not shown, provision can be made for the means 50 and/or 67 to be distinct from the shock-absorbing actuator 9, e.g. being disposed in parallel therewith or at the hinges 12 between the structure 5 and the oscillating system 13.

For example, in FIG. 7, the force-limiter means 67 and the inhibitor means 50 are integrated in the steering pivot 54. In this example, the means 50 and 67 provide the oscillating system 13 with an additional stroke 68 for absorbing energy during a crash.

In this example other force-limiter means 67 and other inhibitor means 50 form parts of the shock-absorbing actuator 9.

In other embodiments, the inhibitor means 50 are arranged to act in the event of a crash to inhibit only retraction of the oscillating system 13.

Energy absorption is then available over the stroke 60 of additional amplitude and possibly also over the additional stroke 68 offered by the force-limiter means 67 located outside the shock absorber 9.

Nevertheless, it can be practical for the specific operation inhibitor means 50 to be arranged in the event of a crash to inhibit both retraction and shock absorption by the shock-absorbing actuator 9.

Under such circumstances, as in FIG. 1, energy absorption is made available over the maximum stroke 58.

In other words, in various examples, the means 67 possess elements and/or functions that are shared with the retraction means 61.

Under such circumstances, the shock-absorbing actuator 9 is in a locked state and its mechanical behavior is comparable to that of a rod or a strut. In the rather common event of the shock-absorbing actuator 9 being hydraulic, throttles or other fluid flow obstructions enable such behavior to be obtained.

In other embodiments, the force-limiter means 67 are distinct from the shock-absorbing actuator 9.

Thus, in FIG. 7, an internal cylinder having the wheel axle 47 of the wheel 4 mounted thereon is held by means 67 in the form of controlled-breakage studs that allow the cylinder to rise in the event of a crash.

The magnitude of the crash stroke may be 40 mm, for example.

Other means 67, e.g. means that provide controlled plastic deformation, can be provided in embodiments of the invention that are not shown.

In the invention, it is thus possible to obtain a rotary wing aircraft 1 such as the helicopter 1 that includes an undercarriage 2 mounted to its fuselage 3 via a force-transmission structure 5.

The undercarriage 2 and the structure 5 are then arranged in such a manner that landing forces are distributed within the structure 5 by the box 6 between the structural bottom floor 10 and the machine top floor 22.

In an embodiment, the structure 5 is covered by a fairing forming part of the fuselage 3.

For example, such a fairing of the fuselage 3 comprises at least:
- a working covering, forming an integral portion of the fuselage 3; and/or
- a transparent surface providing better visibility to the outside of the aircraft 1; and/or
- a hatch, for the landing gear or the like.

In helicopters, having transparent fairing surfaces in the fuselage 3 is very useful for visibility towards the ground, particularly when landing.

As explained above, equipment (such as radars 29 or an infrared detector device 45) is mounted on the structure 5, so as to avoid interfering with installation and operation thereof on the aircraft 1.

Such an aircraft 1 is multipurpose since it can perform the following missions amongst others:
- transporting civilian passengers, including to and from offshore platforms;
- search and rescue;
- medical emergencies;
- transporting military troops;
- identifying and monitoring surface vessels or submarines.

As mentioned above, specifications that are favorable to all of these missions includes in particular:
- moderate ground clearance for the aircraft 1, by obtaining a compromise between the proximity of the bottom of its fuselage 3 with an unprepared landing ground (X, Y);
- direct accessibility to the cabin for commandos or accessibility via simple steps for passengers;
- lateral stability (crosswinds, on deck);
- anti-crash capacity in the landing gear 2 and in the fuselage 3; and
- undercarriage 2 that is retractable so as to reduce fuel consumption and/or increase the speed of the aircraft 1 on long missions (e.g. of more than 3 hours), while leaving the radar with a field of view that is clear over 360°.

With the invention, it is also easy to provide a polygon of support (a triangle for aircraft 1 having three undercarriages, including a nose undercarriage 2) to be well located relative to the center of gravity of the aircraft 1.

This is made possible by the fact that the main wheels 4 of the aircraft 1 are as close as possible to the center of gravity (from behind) without that leading to any risk of the aircraft tilting onto its tail when the cabin is empty.

The invention also makes it possible to ensure that the nose wheels 4 are far enough forwards, while nevertheless not being too far forwards so as to avoid deforming the cabin on the ground or while landing (for example leading to cracks in the canopy).

FIG. 2 shows a clear example of the structure 5, the undercarriage 2, the flight controls, and the avionics equipment being integrated.

The structure 5 in this example comprises the box 6 in the form of a channel-section beam having its longitudinal axis extending substantially vertically.

The shock-absorbing actuator 9 is secured to the outside of the web of the channel-section box 6, on the front side thereof relative to the aircraft 1.

This provides solutions when the shock-absorbing actuator 9 needs to be capable of penetrating into the cockpit and needs to have a structurally strong attachment point therein; under such circumstances, a structure 5 designed in accordance with the invention is appropriate.

When faced with problems of stability on the ground, the solution retained herein is to steer the wheels 4 without them being offset to a large extent, by using an electrical actuator (that can be declutched to allow towing on the ground).

This also presents the advantage of being suitable specifically for use on the deck of a ship where it is necessary to be able to turn around the docking harpoon in order to become aligned with the hangar prior to stopping the engine (and the rotors).

With aircraft 1 of a certain tonnage (e.g. more than 7 tonnes), fitted with nose gear of the straight type, it is necessary to develop prior art landing gear, i.e. it is necessary to undertake development that is specific to naval use without any offset between the wheels and the steering pivot associated with a steering actuator, in order to enable the helicopter to be moved on the deck of a frigate.

Furthermore, with the invention it is possible to provide a nose gear 2 that is very compact at its bottom end: the well 27 for receiving the landing gear 2 need have a length of only about 950 mm while still maintaining 400 mm of ground clearance.

Behavior during a crash becomes entirely appropriate and predictable since:
- the wheels 4 are held in the straight position by the actuator and therefore do not run the risk of entering the well 27 for the landing gear 2 while in a crosswise position; and
- the vertical extent of the well 27 is determined so that the bottom of the structure 5 can be flattened during a crash without being hindered by the wheels 4: they are free to rise far up into the well 27.

Without major difficulty, the shock absorber 9 can combiner the functions of providing normal shock absorption, crash impact absorption, and landing gear retraction, particularly since the raised position of the wheels 4 corresponds to the position taken up by the wheels at the end of a crash.

Within an aircraft 1 of the invention, it even becomes possible to use a shock absorber 9 of the same type (ignoring adjustments) for the nose gear and for the main landing gear (providing it is of the rocker arm type).

Finally, this type of landing gear is less expensive than a nose gear 2 of conventional type, and has been found in testing to be more reliable when faced with piston wear and leakage.

In some embodiments, the steering actuator is an electric motor with a gearbox unit located directly on the axis of the hinges.

With the invention, it is easy to provide for the landing gear 2 to be steerable through at least ±180° and for it to be retractable, and for it to be possible to lock the landing gear 2 on its axis (for straight line towing) while avoiding the shimmy phenomenon.

In variants of the invention in which the actuator 9 is installed substantially in a horizontal position, it is necessary to provide a crank fitting 64 close to the front attachment point of the rocker arm.

This solution avoids the actuator 9 introducing into the cabin.

However, because of the lever arm provided by the crank fitting, the forces generated are amplified and it becomes necessary to reinforce the attachment points on the structure 5 for the shock absorber and for the rocker arm.

What is claimed is:

1. A steerable auxiliary nose undercarriage for a rotary wing aircraft, the undercarriage being retractable substantially rearwards and comprising at least:
    a wheel set having a wheel axle about which at least one wheel rotates;
    a generally longitudinally-extending oscillating system having a first end adjacent to the wheel axle, and a hinged front end that is longitudinally opposite from said first end, the oscillating system being pivotally mounted via at least one transverse hinge for anchoring to a force-transmission structure for being rigidly secured to the aircraft, and the wheel axle being arranged on the oscillating system via a steering pivot; and
    a shock-absorbing actuator having a connection end hinged to the oscillating system between the hinged front end and the first end, the shock-absorbing actuator having a coupling end axially opposite from the connection end, the coupling end being hinged to the structure, the oscillating system being vertically swingable about the hinged front end over a distance that is greater than a shock-absorbing stroke;
    wherein:
    said steering pivot comprises a steering axis substantially intersecting the wheel axle, said steering pivot enabling the wheel to be steered on either side of a position corresponding to the aircraft running in a straight line by means of a steering actuator connected to a portion of the steering pivot that is constrained to pivot with the wheel axle, said steering pivot and said steering actuator both being substantially integrated around the steering axis, so that said steering axis extends through both said steering pivot and said steering actuator; and
    the shock-absorbing actuator possesses means for retracting the oscillating system beyond an abutment position marking the end of the shock-absorbing stroke, so that the oscillating system and the shock-absorbing actuator perform both a function of absorbing shocks and a function of retracting the undercarriage.

2. An undercarriage (2) according to claim 1, wherein the connection end (56) and the coupling end (57) of the shock-absorbing actuator (9) are hinged by ball joints respectively to the oscillating system (13) and to the structure (5), in such a manner that the shock-absorbing actuator (9) is stressed mainly along its sliding axis.

3. An undercarriage (2) according to claim 1, wherein the shock-absorbing actuator (9) extends substantially in an elevation direction (Z), with its coupling end then being a top for being hinged to a portion of the structure (5) which likewise extends substantially in the elevation direction (Z).

4. An undercarriage according to claim 3, wherein the shock-absorbing actuator extends substantially in an elevation direction, the connection end of the shock-absorbing actuator being close to the first end of the oscillating system.

5. An undercarriage according to claim 1, wherein the oscillating system is a trailed single-arm rocker that rocks in elevation.

6. An undercarriage according to claim 1, wherein the wheel set possesses at least one wheel and its tread coming in elevation substantially up to the level of the first end of the oscillating system.

7. A force-transmission structure for a rotary wing aircraft, with at least one undercarriage, said under carriage comprising a steerable auxiliary nose undercarriage for a rotary wing aircraft, the undercarriage being retractable substantially rearwards and comprising at least a wheel set having a wheel axle about which at least one wheel rotates; a generally longitudinally-extending oscillating system having a first end adjacent to the wheel axle, and a hinged front end that is longitudinally opposite from said first end, the oscillating system being pivotally mounted via at least one transverse hinge for anchoring to a force-transmission structure for being rigidly secured to the aircraft, and the wheel axle being arranged on the oscillating system via a steering pivot; and a shock-absorbing actuator having a connection end hinged to the oscillating system between the hinged front end and the first end, the shock-absorbing actuator having a coupling end axially opposite from the connection end, the coupling end being hinged to the structure, the oscillating system being vertically swingable about the hinged front end over a distance that is greater than a shock-absorbing stroke, wherein said steering pivot comprises a steering axis substantially intersecting the wheel axle, said steering pivot enabling the wheel to be steered on either side of a position corresponding to the aircraft running in a straight line by means of a steering actuator connected to a portion of the steering pivot that is constrained to pivot with the wheel axle, and wherein the shock-absorbing actuator possesses means for retracting the oscillating system beyond an abutment position marking the end of the shock-absorbing stroke, so that the oscillating system and the shock-absorbing actuator perform both a function of absorbing shocks and a function of retracting the undercarriage, said under carriage being mounted on said structure said structure comprising at least:
    a rigid arrangement extending substantially in an elevation direction;
    a structural bottom floor rigidly connected to the arrangement and defining at least part of a well for retracting the undercarriage; and
    within the structural bottom floor at least an anchor point for receiving said transverse hinge of the oscillating system of the undercarriage;
    wherein, in longitudinal elevation view, the structure presents an L-shape in which the arrangement forms a transversely centered box and at least two lateral arms which extend substantially in the elevation direction and form with the box a transverse passage on either side of the box, the structural bottom floor extends from the box and the lateral arms substantially longitudinally in a forward direction.

8. A structure according to claim 7, wherein a transverse hinge for anchoring the shock-absorbing actuator is disposed substantially vertically above the box.

9. A structure according to claim 7, wherein the connection end of the shock-absorbing actuator connecting it to the oscillating system is disposed substantially vertically above in the box.

* * * * *